US012016087B2

(12) United States Patent
Kawanabe et al.

(10) Patent No.: US 12,016,087 B2
(45) Date of Patent: Jun. 18, 2024

(54) HEATER AND METHOD OF PRODUCTION OF SAME

(71) Applicant: KYOCERA Corporation, Kyoto (JP)

(72) Inventors: Yasunori Kawanabe, Kirishima (JP); Yoshihiro Okawa, Kirishima (JP); Yuusaku Ishimine, Aira (JP); Shinya Terao, Kirishima (JP)

(73) Assignee: Kyocera Corporation, Kyoto (JP)

( * ) Notice: Subject to any disclaimer, the term of this patent is extended or adjusted under 35 U.S.C. 154(b) by 870 days.

(21) Appl. No.: 17/048,706

(22) PCT Filed: Apr. 24, 2019

(86) PCT No.: PCT/JP2019/017409
§ 371 (c)(1),
(2) Date: Oct. 19, 2020

(87) PCT Pub. No.: WO2019/208626
PCT Pub. Date: Oct. 31, 2019

(65) Prior Publication Data

US 2021/0160968 A1 May 27, 2021

(30) Foreign Application Priority Data

Apr. 27, 2018 (JP) ................................. 2018-086936

(51) Int. Cl.
*H05B 3/14* (2006.01)
*H05B 3/18* (2006.01)

(52) U.S. Cl.
CPC ............... *H05B 3/141* (2013.01); *H05B 3/18* (2013.01); *H05B 2203/003* (2013.01); *H05B 2203/017* (2013.01)

(58) Field of Classification Search
CPC .... H05B 3/141; H05B 3/18; H05B 2203/003; H05B 2203/017; H01L 21/6833; H01L 21/67103; H01L 21/6831
See application file for complete search history.

(56) References Cited

U.S. PATENT DOCUMENTS 5,554,839 A 9/1996 Tsuruta et al.
6,043,468 A * 3/2000 Toya ....................... C30B 15/14 219/544
(Continued)

FOREIGN PATENT DOCUMENTS

JP H06-317550 A 11/1994
JP 2000-021890 A 1/2000
(Continued)

OTHER PUBLICATIONS

Machine Translation Ishida (JP 2014093467) performed Aug. 30, 2023 (Year: 2014).*

*Primary Examiner* — Brian W Jennison
(74) *Attorney, Agent, or Firm* — Procopio, Cory, Hargreaves & Savitch LLP

(57) ABSTRACT

A heater includes a base body and a resistance heating element. The base body is configured by an insulating material and includes a top surface on which a wafer is placed. The resistance heating element extends in the base body along the top surface. A top surface of the resistance heating element and the base body are in contact with each other. A vacuum or gas-filled gap is interposed between a side surface of the resistance heating element and the base body.

12 Claims, 12 Drawing Sheets

(56) References Cited

U.S. PATENT DOCUMENTS

| | | | |
|---|---|---|---|
| 6,507,006 | B1 | 1/2003 | Hiramatsu et al. |
| 2013/0021116 | A1 | 1/2013 | Sogoya et al. |

FOREIGN PATENT DOCUMENTS

| | | | | | |
|---|---|---|---|---|---|
| JP | 2004-327256 | A | | 11/2004 | |
| JP | 2005-340050 | A | | 12/2005 | |
| JP | 2014093467 | | * | 5/2014 | ............ H01L 21/68 |
| WO | 01/63972 | A1 | | 8/2001 | |

* cited by examiner

HEATER AND METHOD OF PRODUCTION OF SAME

TECHNICAL FIELD

The present disclosure relates to a heater and a method of production of the same.

BACKGROUND ART

Known in the art is a heater used in a semiconductor manufacturing apparatus or the like (for example, Patent Literature 1). Such a heater includes a heater plate and heats a wafer placed on the top surface of the heater plate. The heater plate has a plate-shaped base body made of ceramic and a resistance heating element extending within the base body along the top surface of the base body.

Patent Literature 2 discloses not a heater for heating a wafer such as described above, but a heater for heating an oxygen sensor for detecting an oxygen concentration of exhaust gas. This heater has a ceramic base body and a resistance heating element embedded in the base body. Patent Literature 2 proposes forming a gap between the base body and resistance heating element in order to delay entry of cations into the resistance heating element and to accommodate a volume of expansion of the resistance heating element.

CITATION LIST

Patent Literature

Patent Literature 1: International Publication No. 01/63972

Patent Literature 2: Japanese Patent Publication No. 6-317550

SUMMARY OF INVENTION

A heater according to an aspect of the present disclosure includes an insulating base body and a resistance heating element. The base body includes a predetermined surface on which a wafer is placed. The resistance heating element extends in the base body along the predetermined surface. A top surface of the resistance heating element and the base body are in contact with each other. A vacuum or gas-filled gap is interposed between a side surface of the resistance heating element and the base body.

A heater according to an aspect of the present disclosure includes an insulating base body and a resistance heating element. The base body includes a predetermined surface on which a wafer is placed. The resistance heating element extends in the base body along the predetermined surface. A top surface of the resistance heating element and the base body are in contact with each other. A vacuum or gas-filled gap is interposed between a bottom surface of the resistance heating element and the base body.

A method of manufacturing a heater according to an aspect of the present disclosure includes a recessed groove forming step, a material placing step, a stacking step, and a firing step. In the recess forming step, a recess groove extending in a predetermined pattern is formed on a first main surface of a first ceramic green sheet or a second main surface of a second ceramic green sheet. In the material placing step, a material of a resistance heating element is placed on one of the first main surface and the second main surface with the predetermined pattern and a width narrower than that of the recessed groove. In the stacking step, after the recessed groove forming step and the material placing step, the first ceramic green sheet and the second ceramic green sheet are superposed with the first main surface and the second main surface facing each other. In the firing step, the first ceramic green sheet and the second ceramic green sheet superposed on each other are fired.

DESCRIPTION OF EMBODIMENTS

Figure 1A:
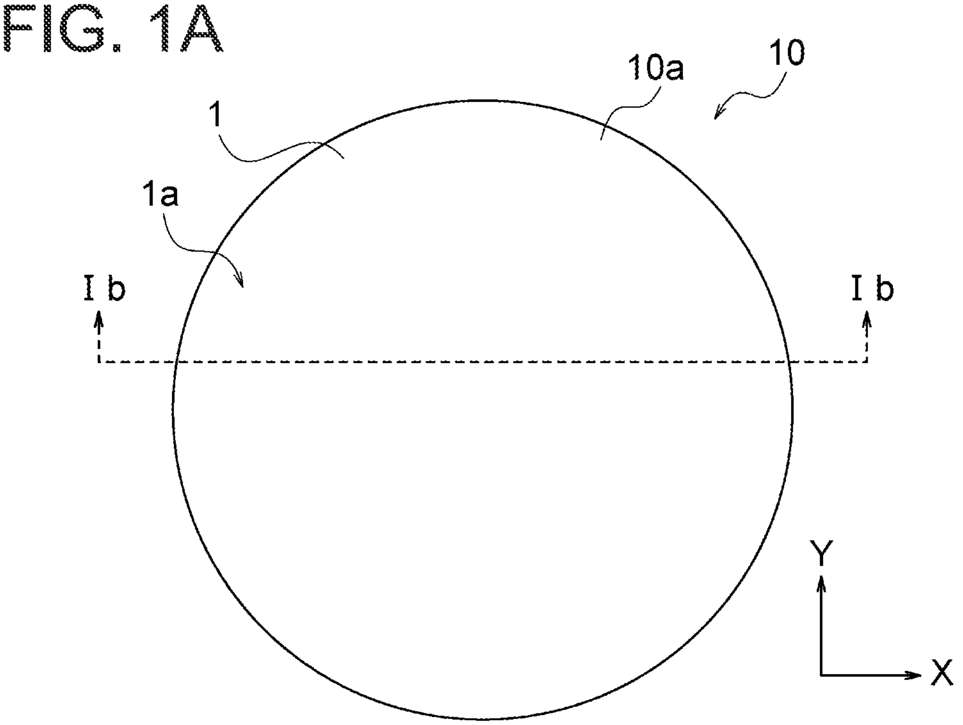
FIG. 1A is a plan view showing the configuration of a heater according to a first embodiment.

Below, heaters according to embodiments of the present disclosure will be described with reference to the drawings. However, the drawings referred to below are schematic ones for convenience of explanation. Therefore, details may be omitted, and the dimensional ratios do not always match the actual ones. Further, the heaters may further include well-known components not shown in the drawings.

First Embodiment (Schematic Configuration of Heater)

Figure 1B:
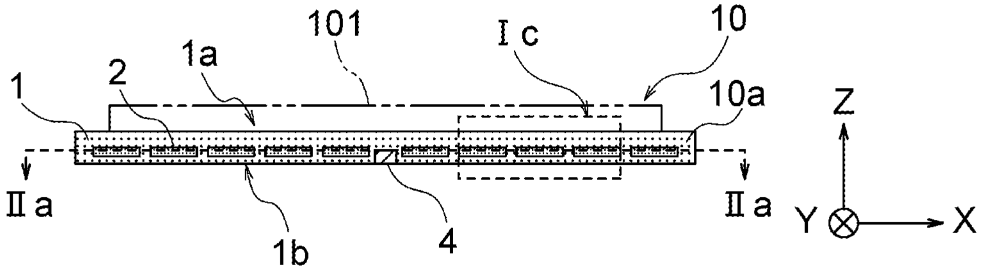
FIG. 1B is a cross-sectional view along a line Ib-Ib in FIG. 1A.
Figure 1C:
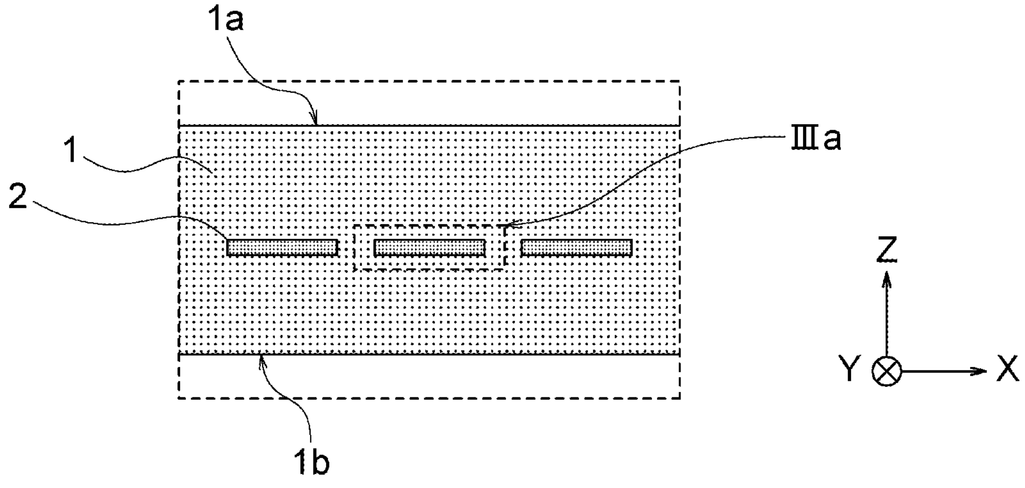
FIG. 1C is an enlarged view of a region Ic of FIG. 1B.
Figure 2A:
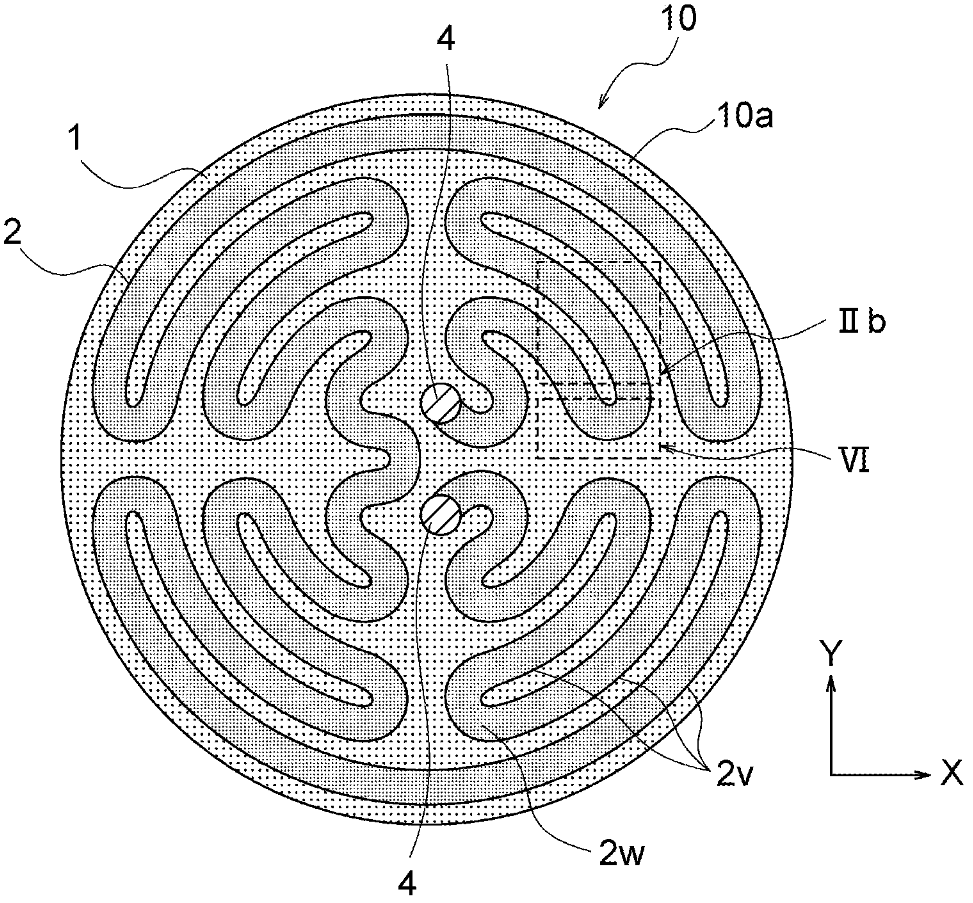
FIG. 2A is a cross-sectional view along a line IIa-IIa in FIG. 1B.
Figure 2B:
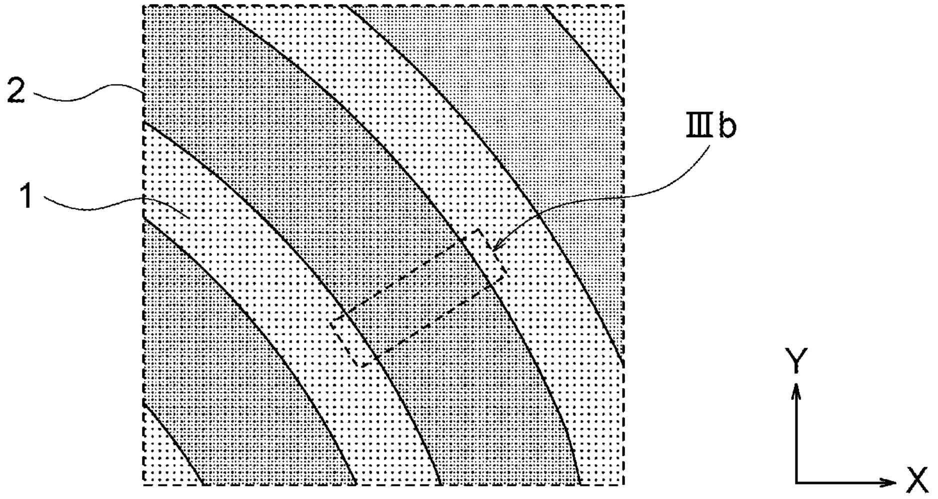
FIG. 2B is an enlarged view of a region IIb of FIG. 2A.

FIG. 1A is a plan view showing a configuration of a heater 10 according to this embodiment. FIG. 1B is a cross-sectional view taken along a line Ib-Ib of FIG. 1B. FIG. 1C is an enlarged view of a region Ic of FIG. 1B. FIG. 2A is a cross-sectional view taken along a line IIa-IIa of FIG. 1B. FIG. 2B is an enlarged view of a region IIb of FIG. 2A.

An orthogonal coordinate system xyz is attached to these figures. When the heater 10 is used, for example, the positive side in the z-axis direction becomes the upper side. The heater 10 has a substantially flat shaped plate 10*a*. Further, the heater 10 is used to heat a wafer 101 placed on the plate 10*a*. Note that, although not particularly shown, the heater 10 may also include, for example, in addition to the plate 10*a*, a pipe hanging from the plate 10*a*, a cable connected to the plate 10*a*, and/or a control part that controls the supply of electric power to the plate 10*a*.

The top surface 1*a* and the bottom surface 1*b* of the plate 10*a* are, for example, substantially flat surfaces. The planar shape and various dimensions of the plate 10*a* may be appropriately set in consideration of the shape and dimensions of the object to be heated. For example, the planar shape is a circle (example shown) or a rectangle. As an example of dimensions, the diameter is 20 cm or more and 35 cm or less, and the thickness is 5 mm or more and 30 mm or less.

The plate 10*a* includes, for example, an insulating base body 1, a resistance heating element 2 embedded in the base body 1, and terminals 4 for supplying electric power to the resistance heating element 2. When a current flows through the resistance heating element 2, heat is generated according to Joule's law, and in turn the wafer 101 mounted on the top surface 1*a* of the base body 1 is heated.

The outer shape of the base body 1 constitutes the outer shape of the plate 10*a*. Therefore, the above description regarding the shape and dimensions of the plate 10*a* may be taken as it is as the description of the outer shape and dimensions of the base body 1. The material of the base body 1 is, for example, a ceramic. The ceramic is, for example, a sintered body containing aluminum nitride (AlN), aluminum oxide ($Al_2O_3$), silicon carbide (SiC), silicon nitride ($Si_3N_4$), and the like as main constituents. The base body 1 does not have to be made of the same material as a whole. For example, different materials may be used on the top surface side and the bottom surface side.

The resistance heating element 2 extends along (for example, in parallel with) the top surface 1*a* and the bottom surface 1*b* of the base body 1. Further, the resistance heating element 2 extends, for example, over substantially the entire surface of the base body 1 in a plan view.

The specific pattern of the resistance heating element 2 in plan view may be made a suitable one. For example, only one resistance heating element 2 is provided on the plate 10*a* and extends from one end to the other end without intersecting with itself. Further, in the illustrated example, the resistance heating element 2 extends so as to reciprocate in a circumferential direction (in a meandering form) in each of the regions obtained by dividing the plate 10*a* into four.

In other words, in the illustrated example, the resistance heating element 2 includes a plurality of extending parts 2*v* that are curved in the circumferential direction while extend alongside each other (for example, in parallel) and bent parts 2*w* that constitute parts where the extending parts 2*v* that are adjacent to each other turn back from one to the other. Note that the shapes of the bent parts 2*w* may be, for example, shapes that are curved as a whole as shown in the drawings or, unlike the example shown in the drawings, shapes that extend linearly between the ends of the extending parts 2*v*. If assuming that ½ of the distance between the center lines of the extending parts 2*v* adjacent to each other is the radius of the bent parts 2*w*, the curvature of the bent parts 2*w* is larger than the curvature of the extending parts 2*v*.

The shape and dimensions of the transverse cross-section of the resistance heating element 2 (cross-section orthogonal to the length direction) are, for example, substantially constant in the length direction of the resistance heating element 2. However, they do not have to be constant. For example, an extending part 2*v* on the inner peripheral side and an extending part 2*v* on an outer peripheral side may have different widths, or the extending parts 2*v* and the bent parts 2*w* may have different widths.

The specific values of the thickness (z-direction) and width of the resistance heating element 2 and the ratio of the two may be set appropriately. In this embodiment, the case where the width is larger than the thickness is taken as an example. That is, in this embodiment, the case where the resistance heating element 2 is formed in a strip shape substantially parallel to the top surface 1*a* is taken as an example. To give an example of the dimensions in this case, the width is 3 mm or more and 15 mm or less, and the thickness is 30 μm or more and 150 μm or less. Further, for example, the width is 20 times or more the thickness. The upper and lower positions of the resistance heating element 2 with respect to the base body 1 may be appropriately set.

The material of the resistance heating element 2 is a conductor (for example, metal) that generates heat when an electric current flows through it. The conductor may be appropriately selected and is, for example, tungsten (W), molybdenum (Mo), platinum (Pt) or indium (In) or an alloy containing these as the main constituents. Further, the material of the resistance heating element 2 may be obtained by firing a conductive paste containing a metal as described above. That is, the material of the resistance heating element 2 may include an additive (an inorganic insulator from another viewpoint) such as glass powder and/or ceramic powder.

The terminals 4 are connected to, for example, both ends of the resistance heating element 2 in the length direction and penetrate through the parts of the base body 1 on the bottom surface 1*b* side at the positions of the two ends of the resistance heating element 2 to be exposed from the bottom surface 1*b*. Due to this, electric power can be supplied to the resistance heating element 2 from the outside of the plate 10*a*. The pair of terminals 4 (two ends of the resistance heating element 2) are located on the center side of the plate 10*a*, for example.

(Space in Heater)

Figure 3A:
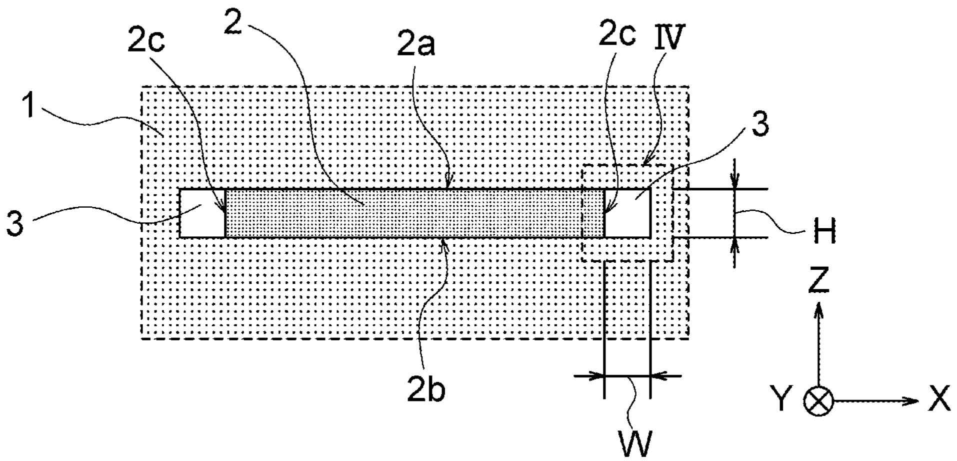
FIG. 3A is an enlarged view of a region IIIa of FIG. 1C.
Figure 3B:
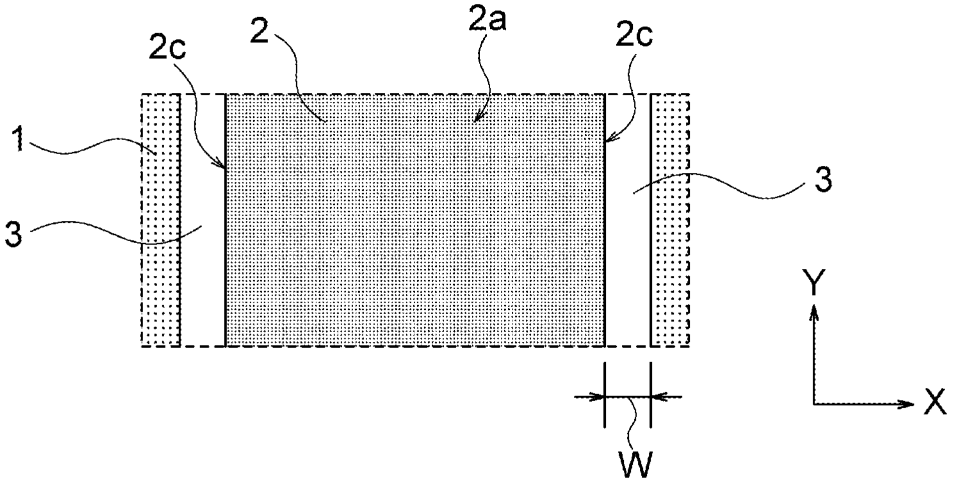
FIG. 3B is an enlarged view of a region IIIb of FIG. 2B.

FIG. 3A is an enlarged view of a region IIIa of FIG. 1C. FIG. 3B is an enlarged view of a region IIIb of FIG. 2B. Note that, in these figures, for convenience, the x-axis is made parallel to the width direction of the resistance heating element 2 and the y-axis is made parallel to the length direction of the resistance heating element 2. These figures are enlarged cross-sectional views of the extension parts 2*v* of the resistance heating element 2. However, the cross-sections of the bent parts 2*w* may be made basically the same as the cross-sections of the extending parts 2*v*.

The resistance heating element 2 has a top surface 2*a* facing a top surface 1*a* side of the base body 1, a bottom surface 2*b* facing a bottom surface 1*b* side of the base body 1, and a pair of side surfaces 2*c* which connect the top surface 2*a* and the bottom surface 2*b* on the two sides in the width direction of the resistance heating element 2. In the illustrated example, the transverse cross-sectional shape of the resistance heating element 2 is substantially rectangular. Therefore, the top surface 2*a*, the bottom surface 2*b*, and the side surfaces 2*c* are substantially flat. Note that, unlike the illustrated example, the boundaries between the top surface 2*a* (or the bottom surface 2*b*) and the side surfaces 2*c* do not necessarily have to be clear.

The top surface 2*a* and the bottom surface 2*b* of the resistance heating element 2 are in contact with the base body 1. On the other hand, at least a part (all in the illustrated example) of the side surfaces 2*c* is not in contact with the base body 1. There is a gap 3 located between the side surfaces 2*c* and the base body 1. Note that the entire top surface 2*a* of the resistance heating element 2 does not have to be in complete contact with the base body. There may be a gap present in part. This gap is smaller compared with the gap on the side surfaces 2*c*, for example.

The gap 3 is evacuated or filled with a gas. The gas is, for example, air or nitrogen. Note that, in theory, the vacuum gap 3 does not transfer heat. In addition, the thermal conductivity of a gas such as air or nitrogen is usually lower than that of the insulating material forming the base body 1.

The gap 3 basically continuously extends over the entire length of the resistance heating element 2. However, parts that are interrupted midway may be formed due to error or intentionally. In other words, the gap 3 includes a part that continuously extend along the resistance heating element 2. The length of the part is for example, longer than the width W of the gap 3, longer than the width of the resistance heating element 2, longer than 10 times these, or longer than 80% of the length of the resistance heating element 2.

The shape and size of the transverse cross-section (cross-sections orthogonal to the length direction of the resistance heating element 2) of the gap 3 may be constant or may vary with respect to the length direction of the resistance heating element 2. The change may be intentional or may be due to manufacturing error. Note that when comparing the length of the part where the gap 3 continuously extends with the width W of the gap 3, the width W may be average value within the entire length of the gap 3 or within the length of the part or may be the maximum value. The same applies when compared with the width of the resistance heating element 2.

Note that in one transverse cross-section, the width of the gap 3 may vary depending on the position in the vertical direction (see FIG. 5B described later). In the present disclosure, when simply referring to the "width of the gap 3", for example, as shown by the width W of FIG. 5B, this shall indicate the maximum width in each of the transverse cross-sections when viewing the perspective plane. Although not shown in particular, the same applies to the width of the resistance heating element 2.

In the description of the embodiments, unless otherwise specified, the shape and size of the transverse cross-section of the gap 3 (and the resistance heating element 2) are basically substantially constant in the longitudinal direction of the resistance heating element 2. That is, unless otherwise specified, the description relating to the shapes and dimensions of the resistance heating element 2 and the gap 3 in one transverse cross-section described below shall be deemed to substantially similarly stand in other transverse cross-sections (same in various specific examples and the second embodiment and on described later). Note that, when the shapes and sizes of the transverse cross-section are not constant in the longitudinal direction, the following description may stand only in a predetermined range in the longitudinal direction.

The shape of the transverse cross-section of the gap 3 may be appropriately set as will be understood from various specific examples of the shapes of the transverse cross-sections described later. In FIG. 3A, a rectangle is illustrated. The rectangle has two sides that are substantially parallel to the top surface 1*a* and the bottom surface 1*b* of the base body 1 and two sides that are orthogonal to the two sides. The two sides that are substantially parallel to the top surface 1*a* and the bottom surface 1*b* of the base body 1 are, for example, substantially flush with the top surface 2*a* and the bottom surface 2*b* of the resistance heating element 2. That is, in FIG. 3A, the height H (size in the z-axis direction) of the gap 3 is made equal to the thickness of the resistance heating element 2.

Various dimensions such as the height H and the width W of the gap 3 may be appropriately set. For example, the height H of the gap 3 (for example, the maximum value, the average value, or the minimum value when the height is not constant in the width direction) may be smaller than the thickness of the resistance heating element 2 (for example, the average value excluding the vicinity of the side surface 2*c*. The same applies in the present disclosure unless otherwise specified.), equal to the thickness of the resistance heating element 2 (for example, the difference between the two being less than 10% of the thickness of the resistance heating element 2), or may be larger than the thickness of the resistance heating element 2. Further, the width W of the gap 3 may be smaller than, equal to, or larger than the height H of the gap 3 (for example, the maximum height when the height is not constant). As an example of the width W, for example, 10 μm or more and 500 μm or less, 1/10 times or more and 20 times or less of the maximum height of the gap 3 or the thickness of the resistance heating element 2, and/or 1/3 or less of the width of the resistance heating element 2. Note that, in the various specific examples relating to the transverse cross-sectional shape of the gap 3 described below, the height and width dimensions and the relative magnitude between the two may be appropriately set.

(Various Specific Examples Related to Transverse Cross-Sectional Shape of Gap)

FIG. 4A to FIG. 5C are views showing various specific examples of the shape of the transverse cross-section of the gap 3 and corresponds to the region IV of FIG. 3A. Note that FIG. 3A may be regarded as a specific example in which the transverse cross-sectional shape of the gap 3 is rectangular or may be regarded as abstractly showing the various specific examples described below.

(First Specific Example of Transverse Cross-Sectional Shape)

Figure 4A:
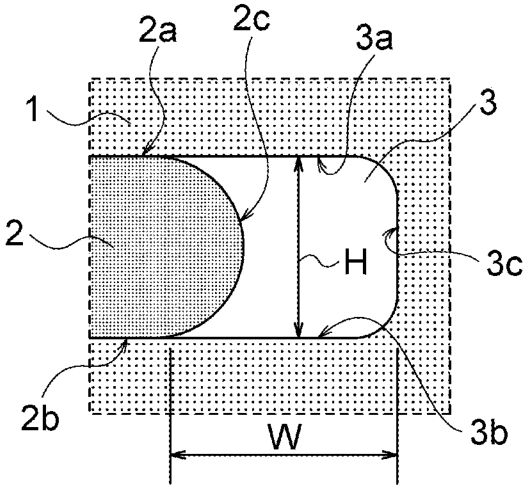
FIG. 4A, FIG. 4B, FIG. 4C, and FIG. 4D are diagrams showing first to fourth specific examples relating to the transverse cross-sectional shape of a gap in the heater according to the embodiment.

In the example of FIG. 4A, a corner part between a side surface 3*c* of the gap 3 (the surface opposite to the resistance heating element 2) and the top surface 3*a* or the bottom surface 3*b* of the gap 3 is chamfered. The chamfered surface may have a curved surface shape as shown in the drawing or may have a flat surface shape unlike the illustrated shape. Note that although not particularly shown, the entire side surface 3*c* may have a curved surface with the resistance heating element 2 side recessed.

Further, in the example of FIG. 4A, a side surface 2*c* of the resistance heating element 2 is a convex surface that bulges outward. The convex surface is, for example, a curved surface. That is, the change in the direction of a tangent line of the convex surface is basically continuous. However, the side surface 2*c* may have minute irregularities as compared with the height H and the width W of the gap 3.

(Second Specific Example of Transverse Cross-Sectional Shape)

Figure 4B:
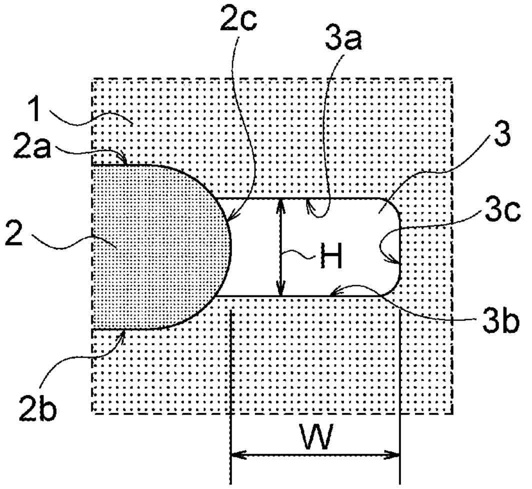

In the example of FIG. 4B, the shape of the gap 3 (and the shape of a side surface 2*c* of the resistance heating element 2) is the same as that of the example of FIG. 4A. However, in the example of FIG. 4A, the height H of the gap 3 was equal to the thickness of the resistance heating element 2, whereas in the example of FIG. 4B, the height H of the gap 3 becomes smaller than the thickness of the resistance heating element 2. In other words, the gap 3 includes a part (the entire gap 3 in this example) whose height is smaller than the thickness of the resistance heating element 2. From another viewpoint, only a part of a side surface 2*c* of the resistance heating element 2 is in contact with the gap 3. The other part of the side surface 2*c* is in contact with the base body 1.

The specific values of the height of a part of the gap 3 that is smaller than the thickness of the resistance heating element 2 and/or the length of the side surface 2*c* of the resistance heating element 2 that is in contact with the gap 3 in the vertical direction (length ignoring the curvature or the like of the side surface 2*a*) may be set appropriately. For example, these values may be less than 9/10 of the thickness of the resistance heating element 2, less than ½, or less than ⅖. Further, these values are, for example, 1 μm or more and/or 1% or more of the thickness of the resistance heating element 2.

Note that in the various examples described later as well, the gap 3 has a part whose height is smaller than the thickness of the resistance heating element 2 and/or a side surface 2*c* of the resistance heating element 2 has only a part in the vertical direction in contact with the gap 3. The specific value of the size in the vertical direction in such examples may be appropriately set as in the above. However, in the description of various examples described later, basically, only the magnitude of the value of the actually illustrated example is referred to. In FIG. 4B, the height of the gap 3 (the length in the vertical direction of the part of the side surface 2*c* that is in contact with the gap 3) is made not less than ½ and less than 9/10 of the thickness of the resistance heating element 2.

The position of the part of a side surface 2*c* of the resistance heating element 2 that is in contact with the gap 3 may be appropriately set. For example, the part, as illustrated, may be a part that is not attached to either the top surface 2*a* or the bottom surface 2*b* or, different from the illustrated part, may be a part that is connected to the top surface 2*a* or a part that is connected to the bottom surface 2*b*. In addition, when neither the top surface 2*a* nor the bottom surface 2*b* is attached, the part may be located substantially at the center of the thickness of the resistance heating element 2 and unlike the illustration, may lean toward the top surface 2*a* side or the bottom surface 2*b* side.

In the various examples described later, part of a side surface 2*c* of the resistance heating element 2 may contact the gap 3. The position where the side surface 2*c* contacts the gap 3 in such an example may be made various positions as described in the above. However, in the description of the various examples described later, basically, only the positions of the actually illustrated examples are referred to. In FIG. 4B, the part of the side surface 2*c* that is in contact with the gap 3 is located at the center of the thickness of the resistance heating element 2. That the part in contact with the gap 3 is located at the center of the thickness of the resistance heating element 2 means that, for example, the central position in the vertical direction of that part falls within ⅓ on the center side in the thickness of the resistance heating element 2.

(Third Specific Example of Transverse Cross-Sectional Shape)

Figure 4C:
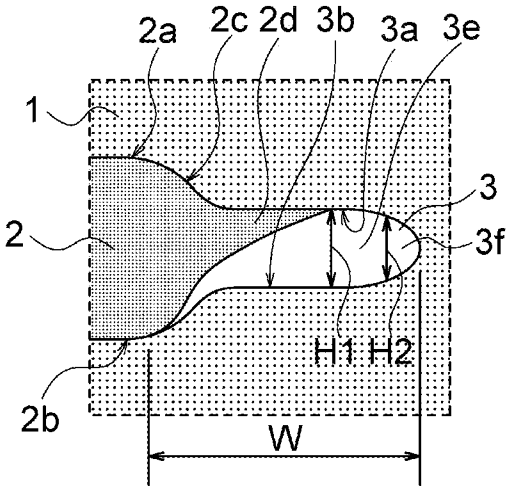

In the example of FIG. 4C, the resistance heating element 2 has a protrusion 2*d* on a side surface 2*c*. The upper side surface of the protrusion 2*d* is in contact with the base body 1 and the lower side surface thereof is separated from the base body 1. That is, the vacuum or gas-filled gap 3 extends between the bottom surface of the protrusion 2*d* and the base body 1.

In the protrusion 2*d*, the specific shape, thickness (vertical direction), amount of protrusion (width direction of the resistance heating element 2), relative size with respect to the gap 3, and the like may be appropriately set. In the illustrated example, the protrusion 2*d* has a tapered shape that becomes thinner toward the tip end side. In the surface of the contact between the protrusion 2*d* and the gap 3, the length parallel to the width direction of the resistance heating element 2 is, for example, ⅓ or more of the width W of the gap 3.

Further, in the example of FIG. 4C, the gap 3 has a first height part 3*e* having a height H1 and a second height part 3*f* having a height H2 lower than the height H1. The second height part 3*f* is located on the side opposite to the side surface 2*c* of the resistance heating element 2 with respect to the first height part 3*e*.

The shapes and sizes of the first height part 3*e* and the second height part 3*f* may be set appropriately. In the illustrated example, the height H1 is smaller than the height H of the gap 3 in the example of FIG. 4B and is ⅖ or more and less than ½ of the thickness of the resistance heating element 2. The first height part 3*e*, assuming that the protrusion 2*d* is not provided, extends from the resistance heating element 2 side to the outside in the width direction of the resistance heating element 2 at a substantially constant height. In the illustrated example, the protrusion 2*d* enters above the space forming the gap 3, so that the gap 3 includes a part with a height lower than the first height part 3*e* on the resistance heating element 2 side with respect to the first height part 3*e*. The second height part 3*f* is tapered so that it becomes thinner the further to the tip end side (the side opposite to the resistance heating element 2).

(Fourth Specific Example of Transverse Cross-Sectional Shape)

Figure 4D:
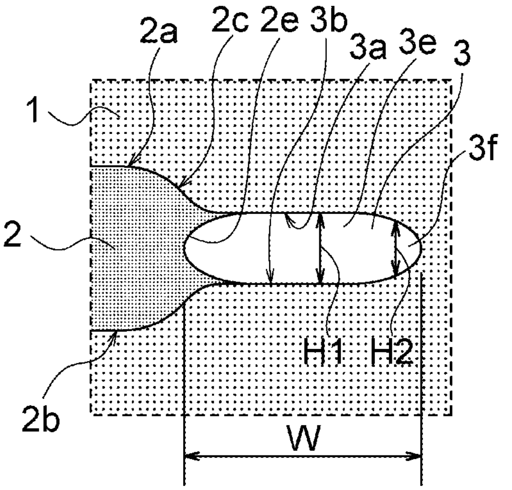

In the example of FIG. 4D, if considering that there were no resistance heating element 2, the shape and size of the empty part (including the gap 3) in the base body 1 are generally similar to the shape and size of FIG. 4C. However, in the example of FIG. 4C, the resistance heating element 2 has the protrusion 2*d* on a side surface 2*c*, whereas in the example of FIG. 4D, the resistance heating element 2 has a recess 2*e* on the side surface 2*c*. From another viewpoint, the gap 3 has a part that enters the side surface 2*c* of the resistance heating element 2. That part includes a part whose height is lower than the first height part 3*e*.

The shape and size etc. of the recess 2*e* may be set appropriately. In the illustrated example, the recess 2*e* has a tapered shape in which the diameter in the vertical direction (the thickness direction of the resistance heating element 2) becomes smaller the further toward the bottom surface side (center side in the width direction of the resistance heating element 2). The maximum diameter in the vertical direction of the recess 2*e* (diameter at the opening surface) is, for example, smaller than the thickness of the resistance heating element 2 and is ⅓ or more and 1 time or less of the height of the gap 3.

(Fifth Specific Example of Transverse Cross-Sectional Shape)

Figure 5A:
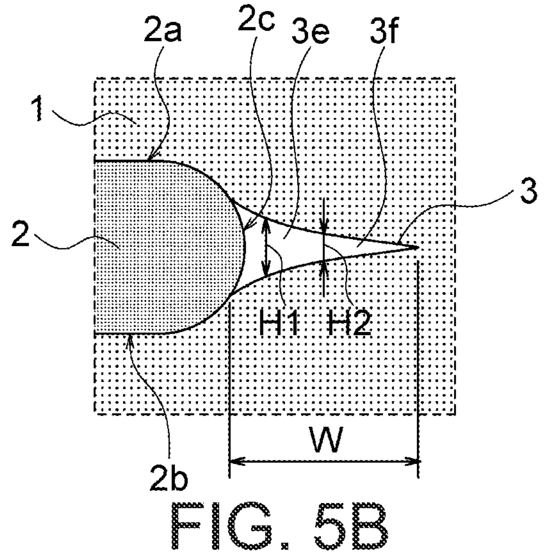
FIG. 5A, FIG. 5B, and FIG. 5C are diagrams showing fifth to seventh specific examples relating to the transverse cross-sectional shape of a gap in the heater according to the embodiment.

In the example of FIG. 5A, the entire gap 3 has a tapered shape in which the diameter in the vertical direction becomes smaller the further to the side opposite to the resistance heating element 2. From another viewpoint, in the same way as in the examples of FIG. 4C and FIG. 4D, the gap 3 has a first height part 3*e* and a second height part 3*f* positioned on the opposite side of the resistance heating element 2 from the first height part 3*e* and having a height H2 lower than the height H1 of the first height part 3*e*.

However, in each of the examples of FIG. 4C and FIG. 4D, the gap 3 had a part (not attached a reference sign) of a height lower than the first height part 3*e* and the part is located on the resistance heating element 2 side than the first height part 3*e*, but, in this example, the first height part 3*e* is in contact with the side surface 2*c* of the resistance heating element 2. In other words, a part of the gap 3 that is in contact with the side surface 2*c* is the part that has the largest height in the gap 3. The height of the part is smaller than the thickness of the resistance heating element 2, for example.

(Sixth Specific Example of Transverse Cross-Sectional Shape)

Figure 5B:
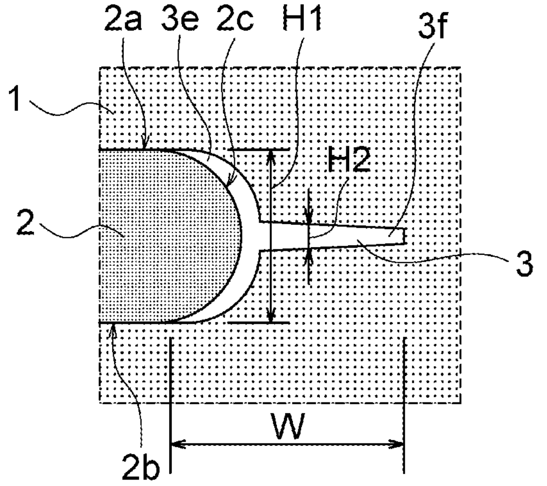

In the example of FIG. 5B, in the same way as in FIG. 4C to FIG. 5A, the gap 3 has a first height part 3*e* of a height H1 and a second height part 3*f* located on the side opposite to the resistance heating element 2 with respect to the first height part 3*e* and having a height H2 lower than the height H1. Further, in the same way as in the case of FIG. 5A, in the gap 3, the first height part 3*e* is in contact with the side surface 2*c* of the resistance heating element 2.

However, in this example, the height of the gap 3 does not gradually decrease as in the other examples described above, but the height of the gap 3 decreases in steps. That is, the change in height between the first height part 3*e* and the second height part 3*f* is relatively rapid. The second height part 3*f* has a shape in which it projects from the first height part 3*e* to the side opposite to the resistance heating element 2.

The shapes and sizes of the first height part 3*e* and the second height part 3*f* may be set appropriately. In the illustrated example, the first height part 3*e* has a height H1 that is approximately equal to the thickness of the resistance heating element 2 and also has a side surface that bulges to the side opposite to the side surface 2*c* of the resistance heating element 2. The height H1 is, for example, ⅘ or more of the thickness of the resistance heating element 2. The second height part 3*f* has a height H2 lower than the height H1 and has a width larger than the height H2.

Note that, as can be understood from the height H1 of FIG. 5B, when the gap 3 is vertically divided by the convex surface or the protrusion of the side surface 2*c* of the resistance heating element 2, the height H of the gap 3 may be defined not as divided, but assuming it were not divided by the convex surface of the resistance heating element 2 or the like.

(Seventh Specific Example of Transverse Cross-Sectional Shape)

Figure 5C:
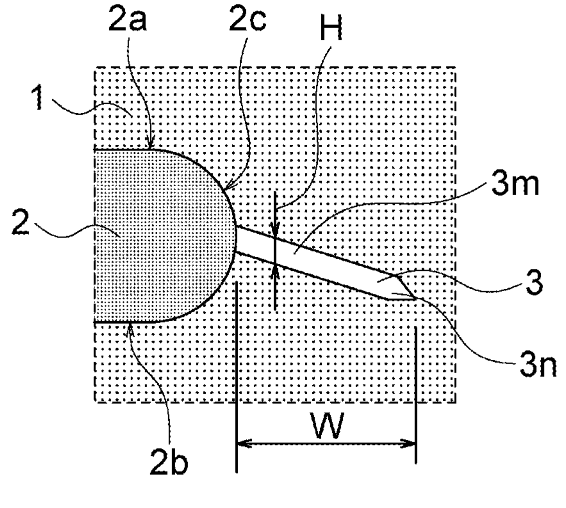

In the example of FIG. 5C, the gap 3 is inclined so as to be positioned downward the farther from the side surface 2*c* of the resistance heating element 2. In other words, the gap 3 includes a first position part 3*m* and a second position part 3*n* located on the side opposite to the side surface 2*c* with respect to the first position part 3*m* and below the first position part 3*m*. Note that, "the second position part 3*n* is positioned below the first position part 3*m*" referred to here does not mean that the entire second position part 3*n* is positioned below the entire first position part 3*m*, but means that the reference position (for example, the center position in the vertical direction) of the second position part 3*n* is lower than the reference position (for example, the center position in the vertical direction) of the first position part 3*m*.

The shapes and sizes of the first position part 3*m* and the second position part 3*n* may be set appropriately. In the illustrated example, the gap 3 extends linearly at a substantially constant height H, and the first position part 3*m* and the second position part 3*n* have mutually equal shapes and heights. The gap 3 is, for example, in contact with the side surface 2*c* of the resistance heating element 2 substantially in the center, and the tip of the gap 3 (on the side opposite to the side surface 2*c*) is located slightly above the bottom surface 2*b* of the resistance heating element 2.

Note that, as described above, the center position of the height H of the second position part 3*n* only have to be located below the center position of the height H of the first position part 3*m*. Therefore, for example, even in the case where the gap 3 has a triangular shape including a horizontal bottom surface and a top surface inclined so as to be located further downward the further from the side surface 2*c* of the resistance heating element 2, it can be said the first position part 3*m* and the second position part 3*n* are provided. In addition, for example, in the example of FIG. 5B, when the center position of the height H2 of the second height part 3*f* is located below the center position of the height H1 of the first height part 3*e*, it can be said that the gap 3 has a first position part 3*m* and a second position part 3*n*.

(Eighth Specific Example of Transverse Cross-Sectional Shape)

Figure 12:
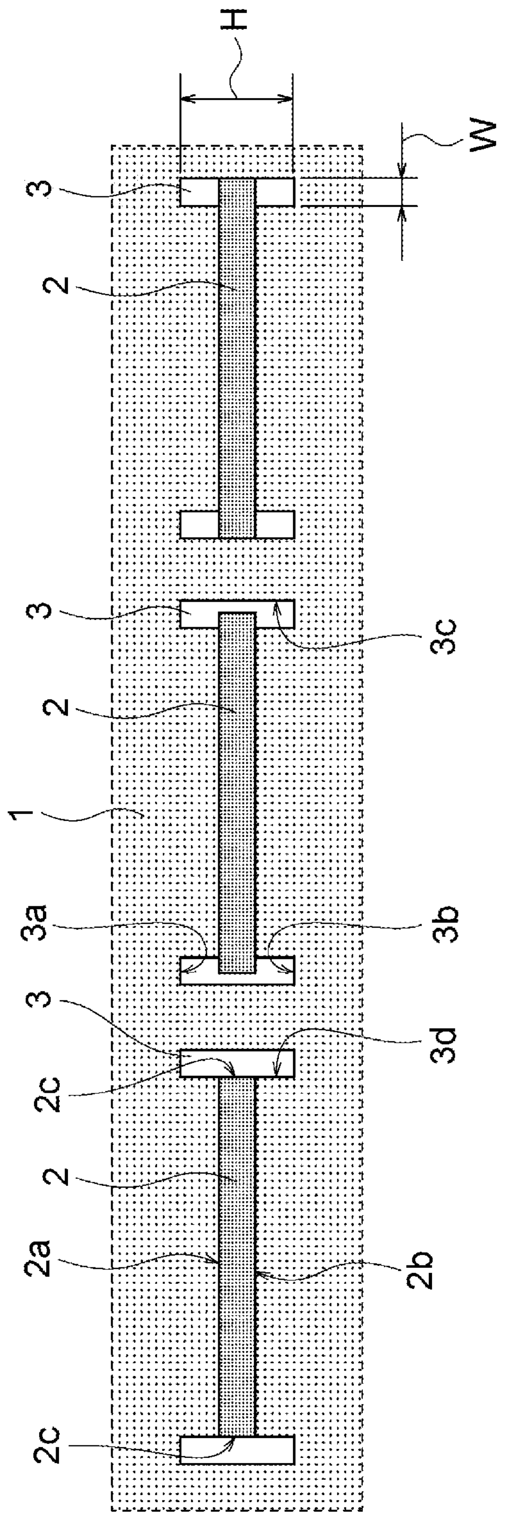
FIG. 12 is a view which shows an eighth specific example of a gap in the heater according to the embodiments.

FIG. 12 is a diagram showing an eighth specific example of the shape of a transverse cross-section of the gap 3 and corresponds to an enlarged view of FIG. 1C.

In this example, the height H of the gap 3 is larger than the thickness of the resistance heating element 2. More specifically, the gap 3 extends above the resistance heating element 2 and extends below the resistance heating element 2. In other words, the top surface 3*a* of the gap 3 is located above the top surface 2*a* of the resistance heating element 2, and the bottom surface 3*b* of the gap 3 is located below the bottom surface 2*b* of the resistance heating element 2.

However, when the height H is larger than the thickness of the resistance heating element 2, the top surface 3*a* may be located above the top surface 2*a*, while the bottom surface 3*b* may be flush with the bottom surface 2*b* or the bottom surface 3*b* may be located between the bottom surface 2*b* and the top surface 2*a*. In the same way, when the height H is larger than the thickness of the resistance heating element 2, the bottom surface 3*b* may be located below the bottom surface 2*b*, while the top surface 3*a* may be flush with the top surface 2*a* or the top surface 3*a* may be located between the top surface 2*a* and the bottom surface 2*b*.

In the gap 3 whose height H is larger than the thickness of the resistance heating element 2, the height H may be larger than, may be the same as, or may be smaller than the width W of the gap 3 (example shown). Further, the specific values of the height H and the width W in this specific example may also be within the ranges of sizes described with reference to FIG. 3A. For example, the height H may be 1.1 times or more and 20 times or less of the thickness of the resistance heating element 2. Further, the height H may be made larger than 20 times the thickness of the resistance heating element 2.

In the description of FIG. 3A, it was described that there may be a part where the gap 3 is interrupted in the lengthwise direction of the resistance heating element 2 due to error or intentionally. In other words, this means that there may be a part where the side surface 2*c* of the resistance heating element 2 contacts the base body 1. In FIG. 12, error or intentional variation of the positional relationship in the width direction of the resistance heating element 2 between the side surface 2*c* and the gap 3 is also shown.

Specifically, at the left side of FIG. 12, a configuration is shown in which the side surface 2*c* of the resistance heating element 2 and the side surface 3*d* of the gap 3 on the resistance heating element 2 side are substantially flush with each other. In the center of FIG. 12, a configuration is shown in which the side surface 2*c* is located in the gap 3 (located between the side surface 3*c* and the side surface 3*d*). At the right side of FIG. 12, a configuration is shown in which the side surface 2*c* is in contact with the side surface 3*c* of the gap 3 opposite to the resistance heating element 2. Although not particularly shown, the resistance heating element 2 may be bent in the gap 3 or the like so that a part other than the side surface 2*c* is in contact with the side surface 3*c* or the like. The one side surface 2*c* of the resistance heating element 2 and the other side surface 2*c* may be different in the above-described positional relationships with respect to the gap 3.

In the case where there is variation such as described above, any of the configurations may occupy a larger ratio in the longitudinal direction of the resistance heating element 2. Further, in FIG. 12, the above-described plurality of configurations were described as being located at different parts in the longitudinal direction of one resistance heating element 2, but any one configuration may also extend over substantially the entire length direction of one resistance heating element 2.

The various specific examples described above may be combined as appropriate. For example, in each of the examples of FIG. 4A, FIG. 4B, and FIG. 5A to FIG. 5C, the entire side surface 2*c* of the resistance heating element 2 was made a convex surface, but as shown in FIG. 4C or FIG. 4D, it may also be made shape having a projection 2*d* or a recess 2*e*. Conversely, in each of FIG. 4C and FIG. 4D, the entire side surface 2*c* may be made convex surface.

In addition, for example, in each of FIG. 4C, FIG. 4D, FIG. 5A, and FIG. 5C, the height of the part of the gap 3 that is in contact with the side surface 2*c* of the resistance heating element 2 (from another perspective, the height H1 and/or maximum height) was made smaller than the thickness of the resistance heating element 2, but the thickness of the part, in the same way as the example of FIG. 4A or FIG. 5B, may also be equal to the thickness of the resistance heating element 2.

Further, for example, the taper shape of the gap 3 in FIG. 5A may be combined with the stepwise change of the height of the gap 3 in FIG. 5B. The shapes of the gap 3 in FIG. 4C to FIG. 5B and the inclination of the gap 3 in FIG. 5C may also be combined.

Further, for example, in the example of FIG. 12, as in the case of FIG. 3A, a flat shaped surface was shown as the side surface 2*c* of the resistance heating element 2, but as the shape of the side surface 2*c*, the shapes of FIG. 4A to FIG. 5C or a combination thereof may also be applied. For example, in FIG. 12, the side surface 2*c* may include a convex surface or a concave surface. Further, for example, in the example of FIG. 12, as the shape of the transverse cross-section of the gap 3, in the same way as in the case of FIG. 3A, a rectangular shape was shown, but the shapes of FIG. 4A to FIG. 5C or combinations thereof may also be applied. For example, in FIG. 12, the gap 3 may have a chamfered corner, the side surface may have a convex surface or concave surface, and the height and/or position may change continuously or stepwise.

(Example of Width of Gap in Bent Part)

Figure 6:
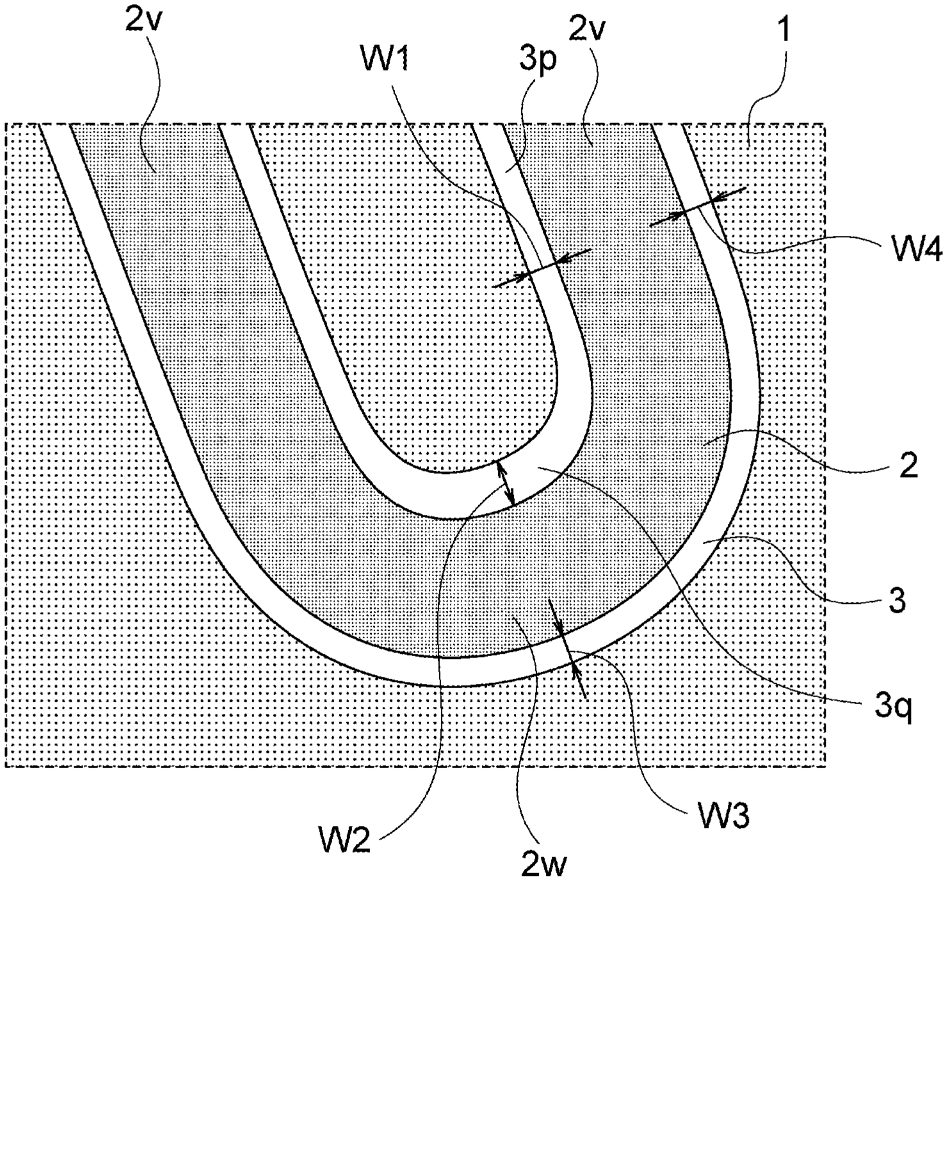
FIG. 6 is an enlarged view of a region VI of FIG. 2A.

FIG. 6 is an enlarged view of a region VI in FIG. 2A.

As described above, the shapes and dimensions of the resistance heating element 2 and the gap 3 in the transverse cross-section may be basically made constant along the longitudinal direction of the resistance heating element 2. However, as shown in FIG. 6, there may be a difference in the shape and/or the size of the gap 3 between an extending part 2*v* and a bent part 2*w*.

In the example shown in FIG. 6, the gap 3 at the inside of the turned back part (the side surrounded by two extending parts 2*v* and a bent part 2*w* connecting the ends thereof) has a first lateral part 3*p* along the extending part 2*v* and a second lateral part 3*q* along the bent part 2*w*. Further, the width W2 of the second lateral part 3*q* is wider than the width W1 of the first lateral part 3*p*. Further, the width W2 of the second lateral part 3*q* is wider than the width W3 of the gap 3 outside the bent part 2*w*. The width W3 may be wider than, equal to, or narrower than the width W4 of the part of the outer gap 3 along the extending part 2*v*.

Note that the shape of the transverse cross-section of the gap 3 may be any of the various specific examples described above. The shapes of the transverse cross-sections of the first lateral part 3*p* and the second lateral part 3*q* may be the same or different. The shapes of the transverse cross-sections of the gap 3 inside the bent part 2*w* and the gap 3 outside may be the same or different. Specific values of the widths W1 to W4 may be set as appropriate. For example, the width W2 is 1.1 times or more or 1.5 times or more the width W1 or W3.

As described above, in the present embodiment, the heater 10 has the base body 1 and the resistance heating element 2. The base body 1 is made of an insulating material and has a predetermined surface (top surface 1*a*) on which a wafer 101 is placed. The resistance heating element 2 extends in the base body 1 along the top surface 1*a*. The top surface 2*a* of the resistance heating element 2 is in contact with the base body 1, and a vacuum or gas-filled gap 3 is interposed between the side surface 2*c* of the resistance heating element 2 and the base body 1.

Therefore, for example, since the top surface 2*a* of the resistance heating element 2 and the base body 1 are in contact with each other, the heat of the resistance heating element 2 is easily transferred to the top surface 1*a* of the base body 1. On the other hand, the gap 3 in contact with the side surface 2*c* exhibits a heat insulating effect, for example. Due to this, for example, the transfer of heat from the resistance heating element 2 to the sides is reduced. Further, for example, since the gap 3 is located between the top surface 1*a* and the bottom surface 1*b*, the liability that heat on the top surface 1*a* side will escape to the bottom surface 1*b* side is reduced. As a result, for example, the wafer on the top surface 1*a* can be efficiently heated. Further, from another viewpoint, for example, since the gap 3 that exhibits a heat insulating effect is located between the top surface 1*a* and the bottom surface 1*b*, the liability that the temperature of the bottom surface 1*b* will affect the top surface 1*a* is reduced. In turn, it is easy to uniformly heat the top surface 1*a*. Due to this, for example, the processing accuracy of the wafer can be improved. Further, uniform heating reduces the liability that excessive thermal stress will be localized in a part of the base body 1.

Further, in the present embodiment, the gap 3 continues in the direction in which the resistance heating element 2 extends, for a length larger than a size of the gap 3, the size being in the width direction of the resistance heating element 2.

Therefore, the gap 3 has a shape extending along the resistance heating element 2, but the length along the side surface 2*c* of the resistance heating element 2 can be increased with respect to its volume. As a result, for example, it is possible to reduce the decrease in the strength of the base body 1 due to the gaps 3 while efficiently obtaining the heat insulating effect by the gap 3.

Further, in the present embodiment, the gaps 3 are formed at both sides of the resistance heating element 2 in the width direction.

Therefore, for example, various effects such as the above-described heat insulating effect are improved. In addition, the resistance heating element 2 of the heater 10 for the wafer usually has parts extending in parallel to each other (in this embodiment, the extending portions 2*v*) regardless of whether the pattern has a meandering shape as in the present embodiment or a spiral shape. When the gaps 3 are formed on both sides of the resistance heating element 2, the part of the base body 1 sandwiched between the extending parts 2*v* alongside each other is sandwiched between the gaps 3 alongside each other and separated from the resistance heating element 2. Therefore, the heat insulating effect of the gap 3 is synergistically improved.

Further, in the present embodiment, the gap 3 may include a part whose size in the vertical direction (height H) is smaller than the size in the vertical direction (thickness) of the resistance heating element 2 (for example, FIG. 4B to FIG. 5C).

In this case, for example, it is possible to obtain the effect of thermally insulating the top surface 1*a* side and the bottom surface 1*b* side of the base body 1 from each other while suppressing the decrease in the volume of the base body 1 and increasing the heat capacity of the base body 1. Further, for example, when the top surface of the gap 3 is located below the top surface 2*a* of the resistance heating element 2, the heat capacity of the base body 1 can be increased on the top surface 1*a* side. When the upper side of the side surface 2*c* of the resistance heating element 2 is in contact with the base body 1, for example, heat can be transferred from the side surface 2*c* to the top surface 1*a* side of the base body 1. From these things, the top surface 1*a* side of the base body 1 can be efficiently heated.

In addition, in the present embodiment, the gap 3 may include a part whose size in the vertical direction is larger than the size in the vertical direction of the resistance heating element 2 (FIG. 12).

In this case, for example, the effect of thermally insulating the top surface 1*a* side and the bottom surface 1*b* side of the base body 1 from each other can be increased. Further, for example, the resistance heating element 2 is easily allowed to expand at the end part in the width direction of the resistance heating element 2. For example, when the resistance heating element 2 expands in the width direction, the end part in the width direction of the resistance heating element 2 may bend upward or downward in the gap 3 and be displaced by the width W or more of the gap 3. As a result, for example, the stress applied to the base body 1 is reduced.

Further, in the present embodiment, the gap 3 may include a first height part 3*e* and a second height part 3*f* located on the opposite side of the side surface 2*c* of the resistance heating element 2 with respect to the first height part 3*e* and having a size in the vertical direction (height H) smaller than that of the first height part 3*e* (FIG. 4C to FIG. 5B).

In this case, for example, it is easy to absorb the displacement of the side surface 2*c* due to the thermal expansion of the resistance heating element 2 by the first height part 3*e* to relieve the thermal stress. On the other hand, for example, the second height part 3*f* suppresses an increase in the volume of the gap 3 while expanding the gap 3 to a position away from the side surface 2*c* of the resistance heating element 2 so as to increase the effect of thermally insulating the top surface 1*a* side and the bottom surface 1*b* side of the base body 1.

In addition, in the present embodiment, the gap 3 may include a first position part 3*m* and a second position part 3*n* located on the side opposite to the side surface 2*c* of the resistance heating element 2 with respect to the first position part 3*m* and below the first position part 3*m* (FIG. 5C).

In this case, for example, it is possible to obtain the above-described heat insulating effect while promoting the transfer of heat from the resistance heating element 2 to the top surface 1*a* of the base body 1 or securing the heat capacity on the top surface 1*a* side of the base body 1. In turn, the effects of the efficiency and homogenization of heating are improved.

In addition, in the present embodiment, the resistance heating element 2 includes two extending parts 2*v* extending alongside each other and a bent part 2*w* forming a turn back part turned back from one of the two extending parts 2*v* to the other in a plan view of the top surface 1*a* of the base body 1. The gap 3 may have a first lateral part 3*p* extending along an extending part 2*v* and a second lateral part 3*q* extending along the bent part 2*w* and having a width wider than that of the first lateral part 3*p* (FIG. 6).

For example, around the bent part 2*w*, since the bent part 2*w* is present in addition to the extending parts 2*v*, the density of the resistance heating element 2 easily increase. As a result, the temperature easily rises relatively. In such a bent part 2*w*, the width of the gap 3 is widened and the heat insulating effect is relatively increased, so that it is easy to realize a uniform temperature rise of the base body 1.

Further, in the present embodiment, the gap 3 inside the bent part 2*w* may have a part wider than the gap 3 outside the bent part 2*w* (FIG. 6).

For example, the region surrounded by the two extending parts 2*v* and the bent part 2*w* is easily reduced in the heat escape area as compared with the outside thereof. As a result, the temperature easily rises relatively. Since the width of the gap 3 is widened and the heat insulating effect is made relatively high on such an inner side, it is easy to realize a uniform temperature rise of the base body 1.

Further, in this embodiment, the side surface 2*c* of the resistance heating element 2 may have a convex surface (for example, FIG. 4A to FIG. 5C).

In this case, for example, the width W (maximum width) of the gap 3 expands inward from the width defined by the part of the side surface 2*c* of the resistance heating element 2 that projects most toward the gap 3 side. Due to this, the heat insulating effect can be improved. Further, for example, as shown in FIG. 4B or the like, when the side surface 2*c* of the resistance heating element 2 is in contact with the base body 1, the contact surface area can be increased by the convex surface. As a result, for example, it is easy to promote the transfer of heat to the top surface 2*a*.

Further, in the present embodiment, the side surface 2*c* of the resistance heating element 2 may have the protrusion 2*d*. The surface of the protrusion 2*d* on the top surface 1*a* side of the base body 1 may be in contact with the base body 1. The gap 3 may include a part that is interposed between the surface of the protrusion 2*d* on the bottom surface 1*b* side of the base body 1 and the base body 1 (FIG. 4C).

In this case, for example, it is possible to maintain the heat insulating effect of the gap 3 while enlarging the contact area of the resistance heating element 2 to the top surface 1*a* side of the base body 1. As a result, for example, the heating efficiency on the top surface 1*a* side is improved.

Further, in the present embodiment, the side surface 2*c* of the resistance heating element 2 may have a recess 2*e* (FIG. 4D).

In this case, for example, it is possible to secure the contact area of the resistance heating element 2 to the base body 1 on the top surface 1*a* side while widening the width W of the gap 3 to reduce the influence of the heat of the bottom surface 1*b* of the base body 1 on the temperature of the top surface 1*a*.

Second Embodiment

Figure 7A:
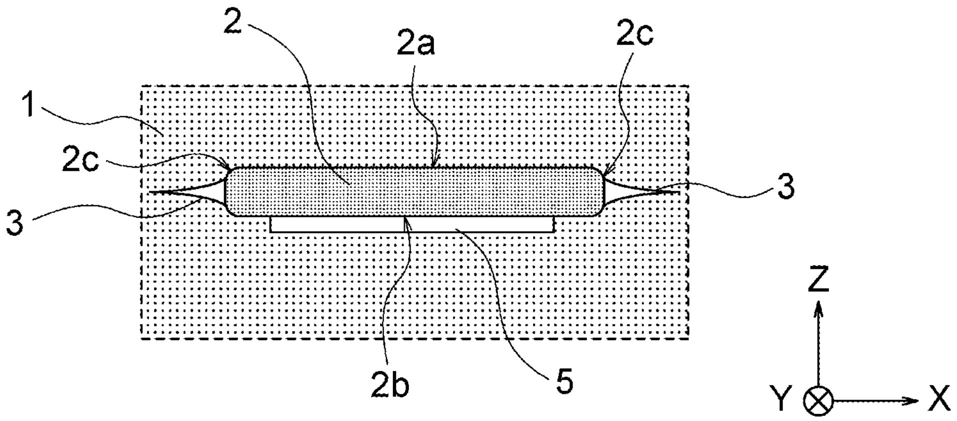
FIG. 7A is a cross-sectional view showing principal parts of a heater according to a second embodiment.

FIG. 7A is a cross-sectional view showing principal parts of a heater according to a second embodiment and corresponds to FIG. 3A.

The heater according to the second embodiment differs from the first embodiment only on the point that a gap 5 is formed between the bottom surface 2*b* of the resistance heating element 2 and the base body 1. The gap 5, like the gap 3 between a side surface 2*c* of the resistance heating element 2 and the base body 1, is a gap that is evacuated or filled with a gas.

Note that, in FIG. 7A, as the shape of the transverse cross-section of the gap 3, the one illustrated in FIG. 5A is shown. However, the shape of the transverse cross-section of the gap 3 is not limited to this. For example, the other specific examples illustrated in the first embodiment may be combined with this embodiment. In addition, in FIG. 7A, as the shape of the transverse cross-section of the resistance heating element 2, a shape with rectangular corners chamfered is shown. However, the shape of the transverse cross-section of the resistance heating element 2 is not limited to this. For example, the various specific examples illustrated in the first embodiment may be combined with this embodiment.

As already stated, the shapes and sizes of the transverse cross-sections of the resistance heating element 2 and the gap are for example basically constant over the entire length of the resistance heating element 2. Therefore, for example, the gap 5 also basically continuously extends over the entire length of the resistance heating element 2. However, there may be a part that is interrupted in the middle. The length of the part of the gap 5 that continuously extends along the resistance heating element 2 is, for example, longer than the width W of the gap 5, longer than the width of the resistance heating element 2, longer than 10 times these, or longer than 80% of the length of the resistance heating element 2.

The shape and size of the transverse cross-section of the gap 5 may be appropriately set. In the illustrated example, the gap 5 extends in the width direction of the resistance heating element 2 at a substantially constant height (z-axis direction). The height of the gap 5 is, for example, ½ or less of the thickness of the resistance heating element 2 and/or 30 μm or less or 10 μm or less, also 1 μm or more and/or 1% or more of the thickness of the resistance heating element 2. The width of the gap 5 is, for example, ½ or more and less than 1 time the width of the resistance heating element 2. Note that in the illustrated example, the gap 5 extends without interruption over the entire width direction, but there may be a part where the gap 5 is interrupted due to manufacturing error or intentionally. Further, the gap 5 is located, for example, on the center side with respect to the width of the resistance heating element 2. However, it may lean to one side in the width direction of the resistance heating element 2.

The gap 3 and the gap 5 are for example basically cut off from each other. However, there may be a transverse cross-section in which the gap 3 and the gap 5 communicate with each other in a part of the resistance heating element 2 in the longitudinal direction. For example, the gap 3 and the gap 5 are cut off from each other over 80% or more of the length in which the gap 5 is formed. When the bottom surface 3*b* of the gap 3 is located below the bottom surface 2*b* of the resistance heating element 2 as in the example of FIG. 12, the bottom surface 3*b* may be located above the bottom surface of the gap 5, may be flush with it, or may be located below it. This also applies to the third embodiment described later.

As described above, in the second embodiment, the heater has the base body 1 and the resistance heating element 2. The base body 1 is made of an insulating material and has a top surface 1*a* on which the wafer 101 is placed (see the first embodiment). The resistance heating element 2 extends in the base body 1 along the top surface 1*a*. Atop surface 2*a* of the resistance heating element 2 is in contact with the base body 1, and a vacuum or gas-filled gap 5 is interposed between the bottom surface 2*b* of the resistance heating element 2 and the base body 1.

Therefore, for example, since the top surface 2*a* of the resistance heating element 2 and the base body 1 are in contact with each other, the heat of the resistance heating element 2 is easily transferred to the top surface 1*a* of the base body 1. On the other hand, the gap 5 in contact with the bottom surface 2*b*, for example, exhibits a heat insulating effect. Due to this, for example, heat transfer from the resistance heating element 2 to the bottom surface 1*b* is reduced. As a result, the wafer on the top surface 1*a* can be efficiently heated.

Further, in this embodiment, the gap 3 and the gap 5 are combined. In this case, for example, by providing the gap 5, in the base body 1, the temperature of the upper side of the resistance heating element 2 is higher than the temperature of the lower side of the gap 5. At this time, the heat in the base body 1 tries to sneak from above the resistance heating element 2 around to the side of the resistance heating element 2 and escape to below the resistance heating element 2. The gap 3 that exhibits a heat insulating effect is located on the path. As a result, for example, the effect of promoting the heating of the top surface 1*a* of the base body 1 is synergistically improved.

Third Embodiment

Figure 7B:
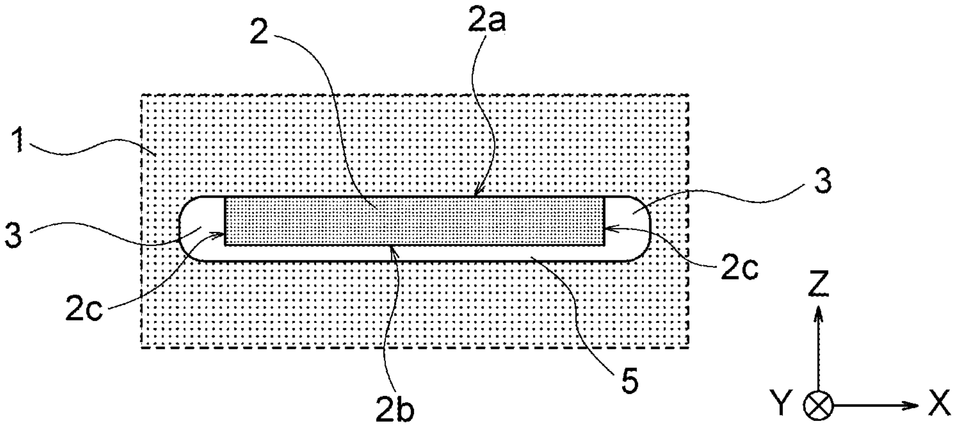
FIG. 7B is a cross-sectional view showing principal parts of a heater according to a third embodiment.

FIG. 7B is a cross-sectional view showing principal parts of a heater according to a third embodiment and corresponds to FIG. 3A.

The third embodiment is different from the second embodiment only on the point that the gap 3 between a side surface 2*c* of the resistance heating element 2 and the base body 1 and the gap 5 between the bottom surface 2*b* of the resistance heating element 2 and the base body 1 communicate with each other.

Note that, in FIG. 7B, as the shape of the transverse cross-section of the gap 3, a substantially semicircular shape is illustrated. That is, the inner surface of the gap 3 is formed into a curved surface recessed at the resistance heating element 2 side. In addition, as the shape of the transverse cross-section of the resistance heating element 2, a rectangular shaped one is illustrated. However, in the same way as in the second embodiment, the shape of the transverse cross-section of the gap 3 and the resistance heating element 2 is not limited to this. For example, the various specific examples illustrated in the first embodiment may be combined with this embodiment.

The sizes etc. of the transverse cross-sections of the gap 3 and gap 5 may be set appropriately in the same way as the first and second embodiments. However, these are set so that the gap 3 and the gap 5 communicate with each other. For example, in the gap 3, the height (z-axis direction) of the resistance heating element 2 on the side surface 2*c* side is equal to or greater than the thickness of the resistance heating element 2 (the gap 3 is similar to the example in FIG. 12) and/or the part on the resistance heating element 2 side leans downward. Further, the width of the gap 5 on the bottom surface 2*b* side of the resistance heating element 2 is equal to or larger than the width of the resistance heating element 2.

Note that the boundary between the gap 3 and the gap 5 need not be clear. Further, in the illustrated example, the gap 5 communicates with both gaps 3 on the two sides, but it may also communicate with only one of them. In this case, the gap 5 may lean to the side of the gap 3 to which the gap 5 communicates, with respect to the resistance heating element 2.

In the above third embodiment as well, the same effect as that of the second embodiment is obtained. For example, heating of the top surface 1*a* of the base body 1 can be promoted. Further, since the gap 5 and the gap 3 communicate with each other, a heat insulating effect can be obtained over the side surface 2*c* and the bottom surface 2*b* of the resistance heating element 2, so the above effect is improved. Note that, in the second embodiment, as compared with the third embodiment, for example, the part that cuts off the gap 3 and the gap 5 functions as a spacer that supports the resistance heating element 2 with respect to the base body 1, so it is easy to secure the strength of the heater.

<Method of Manufacturing Heater>

Figure 8:
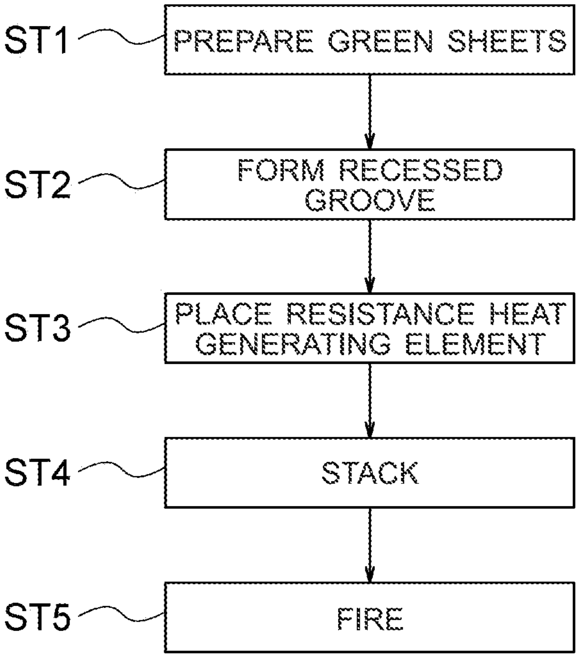
FIG. 8 is a flowchart showing an example of an outline of a procedure of a method of manufacturing a heater according to the embodiments.

FIG. 8 is a flowchart showing an example of the outline of the procedure of the method for manufacturing the heater 10. FIG. 9A to FIG. 9D are schematic cross-sectional views supplementing the flowchart and correspond to FIG. 1B. FIG. 10A is an enlarged view of a region Xa of FIG. 9C. FIG. 10B and FIG. 10C are enlarged views of a region Xb in FIG. 9D. Note that, in the following description, even if the characteristics and shapes of the members change as the manufacturing process progresses, the same reference numerals will sometimes be used before and after the change.

Figure 9A:
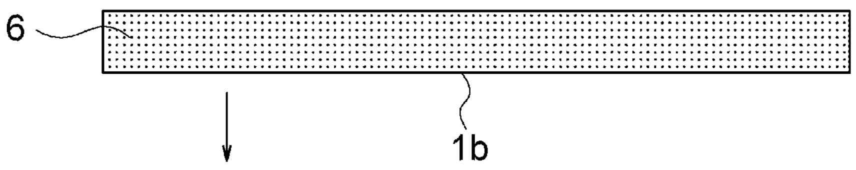
FIG. 9A, FIG. 9B, FIG. 9C, and FIG. 9D are schematic cross-sectional views supplementing the flowchart of FIG. 8

At step ST1, as shown in FIG. 9A (and FIG. 9C), ceramic green sheets 6 and 7 for forming the base body 1 are prepared. As can be understood from the reference numerals of the top surface 1*a* and the bottom surface 1*b*, the ceramic green sheet 6 forms the bottom surface 1*b* side part of the base body 1, and the ceramic green sheet 7 forms the top surface 1*a* side part of the base body 1. However, the relationship between the ceramic green sheets 6 and 7 and the top surface 1*a* and the bottom surface 1*b* may be opposite to the above as well. The method for manufacturing the ceramic green sheets may be the same as various known methods.

Figure 9B:
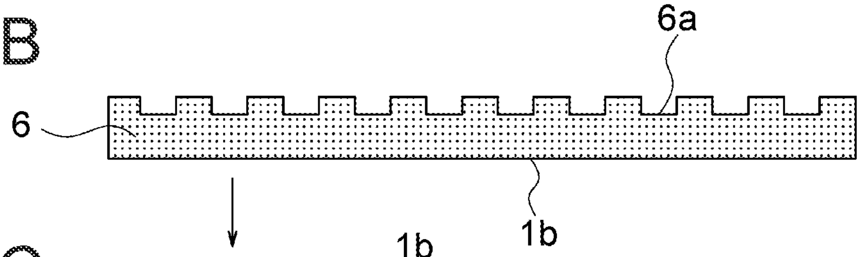

At step ST2, as shown in FIG. 9B, the recessed groove 6*a* is formed in the ceramic green sheet 6. The recessed groove 6*a* is a part that accommodates the resistance heating element 2 in the base body 1 and partially forms the gap 3 (and the gap 5) and extends in a pattern substantially the same as the pattern of the resistance heating element 2 in a plan view. The method of forming the recessed groove 6*a* may be any appropriate method. For example, a blast method in which abrasive grains are blasted on the ceramic green sheet 6 to cut away the ceramic green sheet 6 may be used.

Figure 9C:
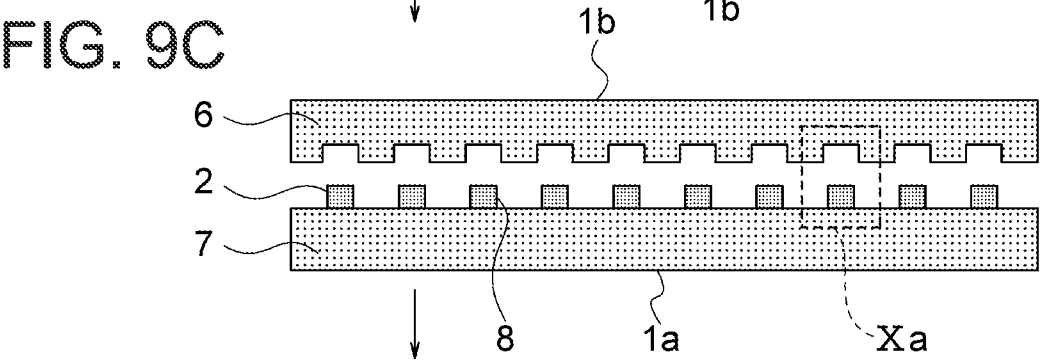
Figure 10A:
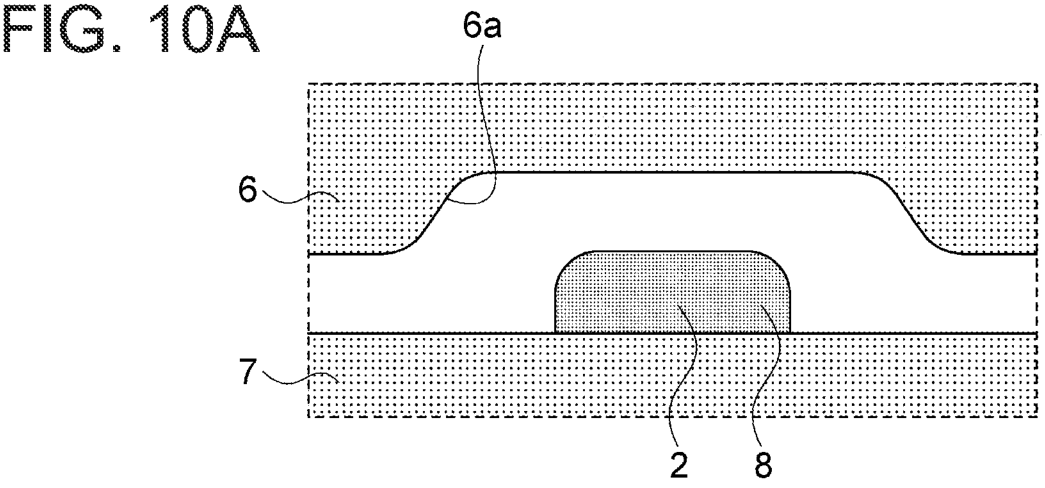
FIG. 10A is an enlarged view of a region Xa of FIG. 9C, and FIG. 10B and FIG. 10C are enlarged views of a region Xb of FIG. 9D.
Figure 10B:
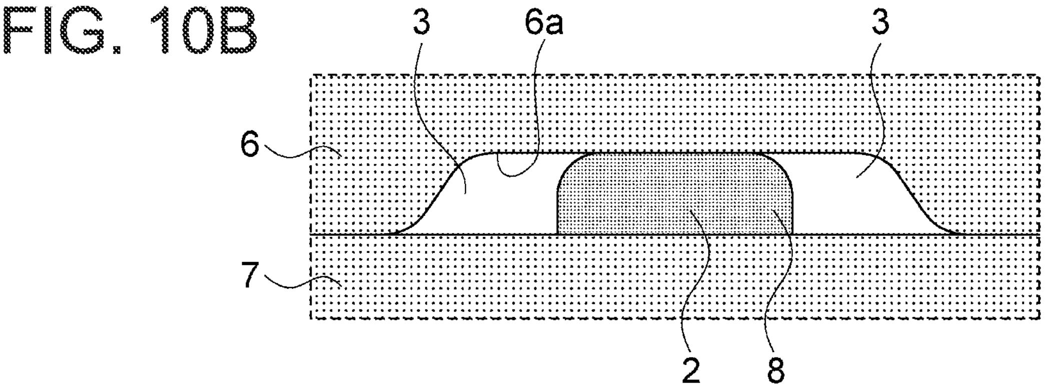
Figure 10C:
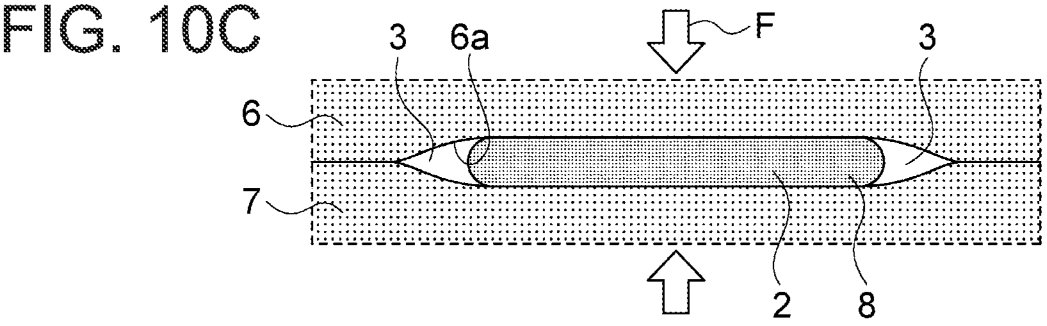

At step ST3, as shown in FIG. 9C and FIG. 10A, a conductive material 8 (for example, conductive paste) that forms the resistance heating element 2 is arranged on the ceramic green sheet 7. The conductive material 8 is arranged in a pattern similar to the pattern of the resistance heating element 2 in a plan view. The method of placing the conductive material 8 may be various known methods. For example, screen printing may be used. Note that although not particularly shown, the conductive material 8 can be placed in the recessed groove 6*a* of the ceramic green sheet 6 instead of the ceramic green sheet 7.

Figure 9D:
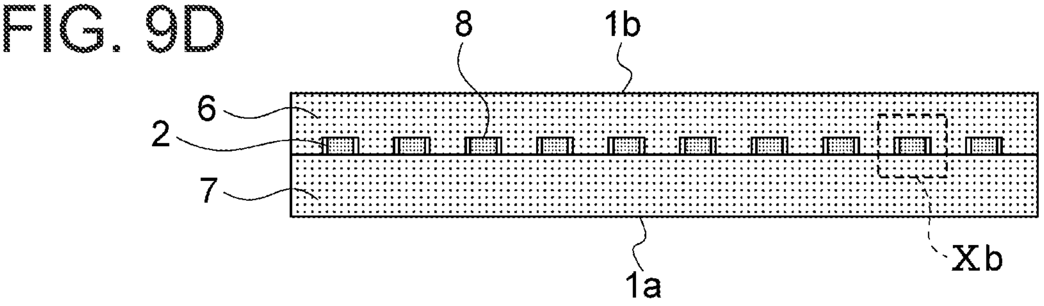

At step ST4, as shown in FIG. 9D and FIG. 10B, the ceramic green sheets 6 and 7 are bonded to each other. At this time, the conductive material 8 is housed in the recessed groove 6*a*. The width of the recessed groove 6*a* is wider than the width of the conductive material 8, and a space forming the gap 3 is formed on both sides of the conductive material 8. At the time of bonding, as shown in FIG. 10C, a compressive force F may be applied in the thickness direction. As a result, the recessed groove 6*a* and the conductive material 8 may be crushed and deformed.

At step ST5, the ceramic green sheets 6 and 7 are fired. As a result, the base body 1 in which the resistance heating element 2 is embedded is created. That is, the heater 10 is manufactured.

In the above-described manufacturing method, the shapes and dimensions of the recessed groove 6*a* and the conductive material 8, the atmosphere around the ceramic green sheets, the pressure applied to the ceramic green sheets, and other various conditions are appropriately adjusted to thereby realize various specific examples etc. relating to the shape of the transverse cross-section of the gap 3.

For example, when the ceramic green sheets are bonded, the parts of the recessed grooves 6*a* that form the gaps 3 may crushed and/or the parts of the ceramic green sheets that overlap the conductive material 8 may be recessed so that a gap 3 thinner than the thickness of the resistance heating element 2 such as shown in FIG. 4B to FIG. 5C is formed. In order to cause such deformation, for example, the recessed groove 6*a* may be made shallow with respect to the thickness of the conductive material 8, the compressive force F may be made relatively large, the ceramic green sheets may be made relatively soft, the viscosity of the conductive materials may be made relatively high, and/or the ceramic green sheet may be bonded under a reduced pressure atmosphere (the gap 3 may be depressurized).

Further, for example, in the recessed groove 6*a*, deeper parts than the widthwise center side may be formed on both sides in the width direction and/or recessed grooves may be formed at positions facing both sides in the width direction of the recessed groove 6*a* of the ceramic green sheet 7 so as to form a gap 3 thicker than the thickness of the resistance heating element 2 such as shown in FIG. 12.

Further, for example, the shape of the transverse cross-section of the recessed groove 6*a* may be made close to a rectangle to realize the shapes shown in FIG. 3A, FIG. 4A, and FIG. 4B.

Further, for example, as can be understood from FIG. 10A to FIG. 10C, the recessed groove 6*a* may be formed so that the diameter is increased the further toward the opening side to realize a shape where the height becomes smaller the further from the resistance heating element 2 in all or part of the gap 3 such as shown in FIG. 4C to FIG. 5A. Note that the recessed groove 6*a* whose diameter increases the further toward the opening side can be formed by a blast method.

Further, for example, the amount of shrinkage of the resistance heating element 2 after firing may be made relatively large as compared with the amount of shrinkage of the base body 1 and the side surface 2*c* of the resistance heating element 2 may be separated from the base body 1 toward the center side in the width direction to form the first height part 3*e* shown in FIG. 5B.

In addition, for example, when the ceramic green sheets are bonded, the ceramic green sheets 7 may be pressed by the conductive material 8 to form a recess, so that the gap 3 is located on the center side of the thickness of the resistance heating element 2. Alternatively, one of the ceramic green sheets 6 and 7 may be made relatively soft so that the gap 3 is leans to the one side.

Further, for example, by widening the width of the recessed groove 6*a* toward the inside of the bent part 2*w* at the part corresponding to the bent part 2*w*, the relatively wide second lateral part 3*q* shown in FIG. 6 may be realized. Note that although not shown in particular, by making the position of the recessed groove 6*a* lean to one side in the width direction of the conductive material 8, the gap 3 may be formed only on one side in the width direction of the resistance heating element 2 or the width of the gap 3 at one side may be made wider than the width of the gap 3 at the other side.

Further, for example, the gap 5 may be formed by making the depth of the recessed groove 6*a* larger than the thickness of the conductive material 8. Alternatively, the amount of shrinkage of the resistance heating element 2 after firing is relatively large compared to the amount of shrinkage of the base body 1, so the bottom surface 2*b* of the resistance heating element 2 may be separated from the base body 1 to form the gap 5. A chemical may be applied to the surface of the ceramic green sheets 6 and/or 7 so that the bottom surface 2*b* is separated in preference to the top surface 2*a*. In addition, for example, if unevenness is formed on the bottom surface of the recessed groove 6*a* so that the convex parts abut against the conductive material 8 and the concave parts separate from the conductive material, the gap 5 cut off from the gap 3 in FIG. 7A can be formed.

In addition, for example, when stacking the ceramic green sheets, by appropriately selecting the method of placement of the conductive material 8 or by crushing the conductive material 8, a curved (convex) side surface 2*c* may be realized in the resistance heating element 2 as shown in FIG. 4A, FIG. 4B, and FIG. 5A to FIG. 5C. Further, the crushed conductive material 8 may protrude into the gap 3 to realize the resistance heating element 2 having the protrusion 2*d* as shown in FIG. 4C. Further, for example, the amount of shrinkage of the resistance heating element 2 after firing may be relatively large compared with the amount of shrinkage of the base body 1. Due to this, the part not in contact with the base body 1 may be recessed and a resistance heating element 2 having a recess 2*e* as shown in FIG. 4D may be realized. The pressure reduction of the atmosphere at the time of bonding the ceramic green sheets may not be executed or the pressure reduction may be suppressed, a resistance heating element 2 having a recess 2*e* as shown in FIG. 4D may be realized by the pressure of gas in the gap 3.

Figure 11A:
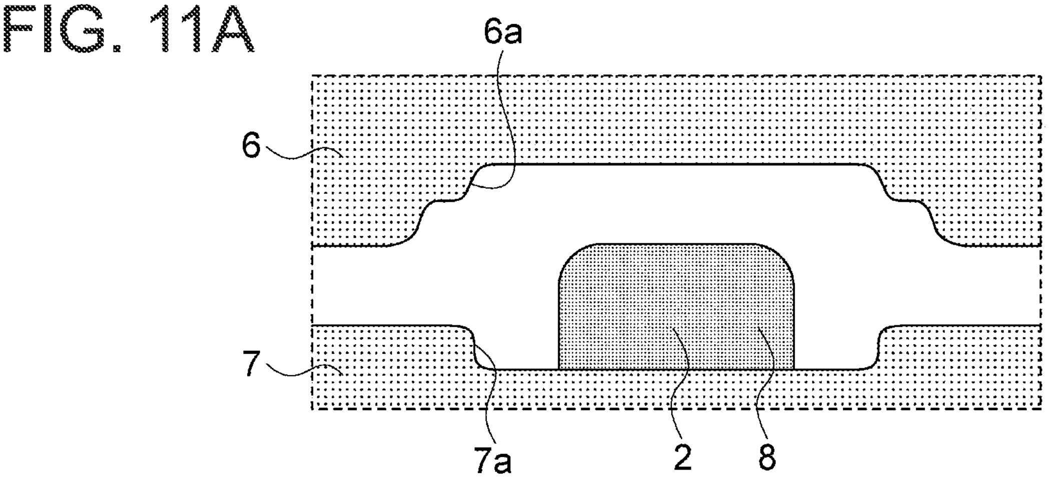
FIG. 11A, FIG. 11B, and FIG. 11C are views for explaining modifications of the method of manufacturing a heater.
Figure 11B:
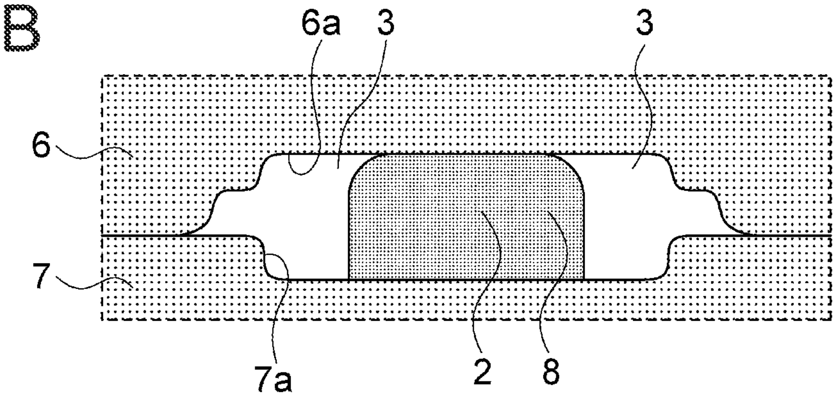

FIG. 11A is a diagram showing a modification of the method of manufacturing a heater and corresponds to FIG. 10A. Further, FIG. 11B is a diagram showing a continuation of FIG. 11A and corresponds to FIG. 10B.

As shown in the figures, the recessed groove 7*a* may be formed not only in the ceramic green sheet 6 but also in the ceramic green sheet 7. In addition or alternatively, the recessed groove 6*a* (may be the recessed groove 7*a*) may have unevenness on the side surfaces. Further, as can be understood from FIG. 11B, due to this unevenness, a gap 3 having the first height part 3*e* and the second height part 3*f* as shown in FIG. 5B or the like may be realized. Note that the unevenness for example can be realized by using a blast method.

Figure 11C:
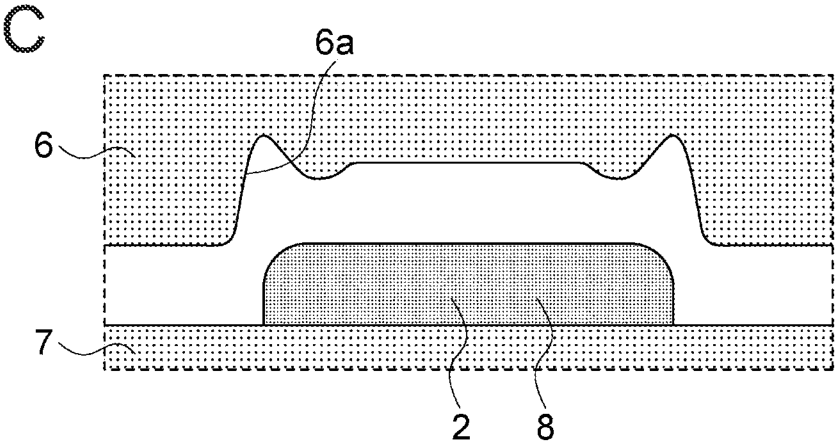

FIG. 11C is a diagram showing another modification of the method of manufacturing a heater and corresponds to FIG. 10A.

As described above, unevenness may be formed on the bottom surface of the recessed groove 6*a*. FIG. 11C shows an example of unevenness on the bottom surface. In this example, compared with the center side in the width direction of the bottom surface, the bottom surface of the recessed groove 6*a* is deeper at the corners formed by the side surface of the recessed groove 6*a* and higher at the inner side of the corners. Such a recessed groove 6*a* easily forms the gap 5 shown in FIG. 7A, for example. Such a shape can be formed by the blast method.

Note that the gap 3 having the first position part 3*m* and the second position part 3*n* such as shown in FIG. 5C may be realized by the deep part near the side surface of the recessed groove 6*a* in FIG. 11C being crushed to form the gap 3.

The heater according to the present disclosure is not limited to the above embodiments and may be worked in various ways.

For example, the heater is not limited to a heater having only one layer of resistance heating element and may have two or more layers of resistance heating elements. Further, the resistance heating element in one layer may be divided into a plurality of parts or power feed points may be provided at a plurality of positions of the one resistance heating element to enable individual control of the amount of heat generation.

In addition to the resistance heating element and the terminals, the heater may have a wiring pattern for connecting the terminals and the resistance heating element in a layer different from the layer of the resistance heating element. Further, the heater may be configured so as to perform other functions as well as the function as the heater. For example, the heater may have an electrode to function as an electrostatic chuck in the base body.

As will be understood from the above description, the heater is not limited to one made of two layers of ceramic green sheets and may be made of an appropriate number of ceramic green sheets. Further, the method of manufacturing the heater is not limited to the method of firing stacked ceramic green sheets and may be the method of sequentially forming the insulating layers. From another point of view, the insulating material forming the base is not limited to ceramic.

In the second and third embodiments, a combination of the gap 3 between a side surface of the resistance heating element and the base body and the gap 5 between the bottom surface of the resistance heating element and the base body was shown. However, only the gap 5 may be formed without forming the gap 3.

The right side of the paper of FIG. 12 showed the configuration in which the side end part of the resistance heating element 2 is inserted into the gap 3 located on the side of the resistance heating element 2, and the side surface 2*c* of the resistance heating element 2 contacts the base body 1. This configuration may extend over the entire length of the resistance heating element 2. In this case, the part of the gap 3 located below the resistance heating element 2 may be regarded as the gap 5 of the second and third embodiments.

Further, from the example of FIG. 12, it is possible to extract a technical idea that does not require the gap 3 to be interposed between a side surface 2*c* of the resistance heating element 2 and the base body 1. For example, the heater may be configured so that a region of the top surface of the resistance heating element on the center side in the width direction is in contact with the base body and so that a gap is formed between region of at least one side of the top surface of the resistance heating body in the width direction and the base body.

REFERENCE SIGNS LIST

1 . . . base body, 1*a* . . . top surface (predetermined surface), 2 . . . resistance heating element, 3 . . . gap, 101 . . . wafer.

The invention claimed is:

1. A heater comprising:

an insulating base comprising a predetermined surface on which a wafer is placed, and a resistance heating element extending in the base body along the predetermined surface, wherein a top surface of the resistance heating element and the base body contact each other, and a vacuum or a gas-filled gap is interposed between a side surface of the resistance heating element and the base body, the gap comprises a first height part, and a second height part that is located on a side opposite to the side surface of the resistance heating element with respect to the first height part and has a size in a vertical direction smaller than that of the first height part.

2. The heater according to claim 1, wherein the gap is continuous in a direction in which the resistance heating element extends, for a length larger than a size of the gap, the size being in a width direction of the resistance heating element.

3. The heater according to claim 1, wherein the gaps are formed on both sides in a width direction of the resistance heating element.

4. The heater according to claim 1, wherein the gap includes a part whose size in a vertical direction is smaller than a size in the vertical direction of the resistance heating element.

5. The heater according to claim 1, wherein the gap includes a part whose size in a vertical direction is larger than a size in the vertical direction of the resistance heating element.

6. The heater according to claim 1, wherein the gap comprises a first position part, and a second position part that is located on a side opposite to the side surface of the resistance heating element with respect to the first position part and below the first position part.

7. The heater according to claim 1, wherein in a plan view of the predetermined surface, the resistance heating element comprises two extending parts that extend alongside each other, and a bent part that constitutes a turn back part from one of the two extending parts to the other, and the gap comprises a first lateral part along one of the extending parts and a second lateral part along the bent part and wider than the first lateral part.

8. The heater according to claim 1, wherein the gaps are formed on both sides of the resistance heating element in a width direction, in a plan view of the predetermined surface, the resistance heating element comprises two extending parts that extend alongside each other, and a bent part that constitutes a turn back part from one of the two extending parts to the other, and the gap inside the bent part comprises a part that is wider than the gap outside the bent part.

9. The heater according to claim 1, wherein the side surface of the resistance heating element comprises a convex surface.

10. The heater according to claim 1, wherein the side surface of the resistance heating element comprises a protrusion, a surface of the protrusion on a side where the predetermined surface is located is in contact with the base body, and the gap comprises a part which is interposed between a surface of the protrusion on a side opposite to the predetermined surface and the base body.

11. The heater according to claim 1, wherein the side surface of the resistance heating element comprises a recess.

12. The heater according to claim 1, wherein another vacuum or gas-filled gap is interposed between a bottom surface of the resistance heating element and the base body.

* * * * *